Jan. 23, 1940.　　　W. W. FRYMOYER　　　2,188,100
TELEMETRIC SYSTEM
Filed Dec. 24, 1936　　　3 Sheets-Sheet 1

INVENTOR
Webster W. Frymoyer
BY
Blair, Curtis & Dunne
ATTORNEYS

Jan. 23, 1940.  W. W. FRYMOYER  2,188,100
TELEMETRIC SYSTEM
Filed Dec. 24, 1936  3 Sheets—Sheet 2

INVENTOR
Webster W. Frymoyer
BY
Blair, Curtis + Dunne
ATTORNEYS

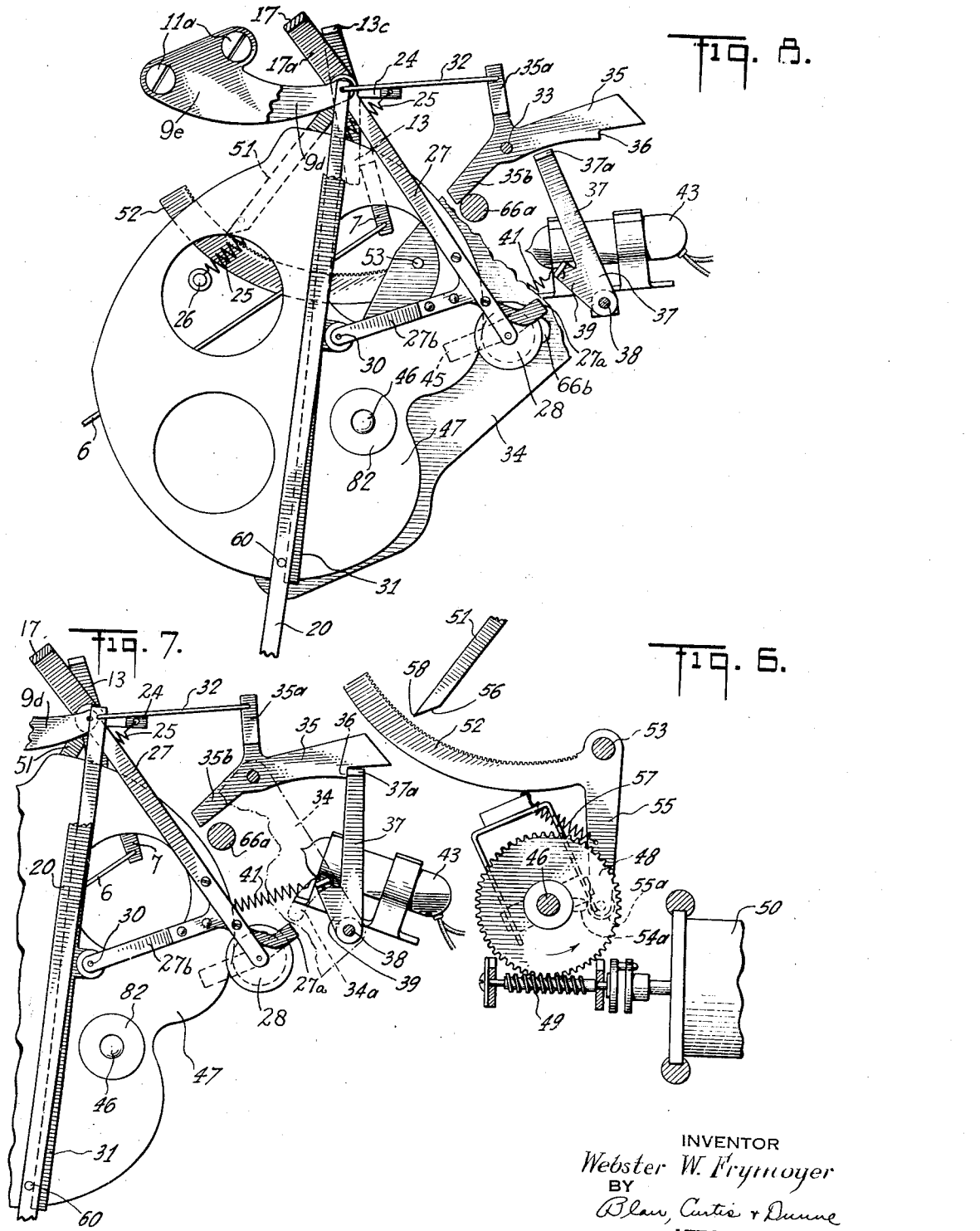

Patented Jan. 23, 1940

2,188,100

UNITED STATES PATENT OFFICE 2,188,100

TELEMETRIC SYSTEM

Webster W. Frymoyer, Foxboro, Mass., assignor to The Foxboro Company, Foxboro, Mass., a corporation of Massachusetts Application December 24, 1936, Serial No. 117,507

27 Claims. (Cl. 177—351)

This invention relates to telemetric systems, and particularly to a transmitter for such systems wherein the reading of an instrument measuring a value of a variable condition is transmitted by means of an electrical circuit to a point distant from the transmitter.

In industrial plants, particularly those spread over a large area, it is often desirable to have values of conditions, such as temperature, pressure, liquid level, flow of material, etc., existing in different parts of the plant, all visible at one instrument board; or it may be desirable to know at a central station the pressure or other condition existing at some remote point in an oil or gas line.

In telemetric systems designed for solving this problem, it is customary to locate a transmitter at the point of measurement and a receiver at the central station for receiving the measurements sent by the transmitter.

In one type of system, constant speed mechanisms are provided at the transmitter and the receiver. The constant speed mechanism at the transmitter moves a feeler member at a known speed and the constant speed mechanism at the receiver moves a positioning member at a known speed. The transmitter and the receiver are connected by an electrical circuit whereby movement of the feeler member controls the engagement of the positioning member by the constant speed mechanism. This circuit is such that when the feeler starts its movement at the beginning of a cycle a switch is closed and remains closed until the transmitter feeler reaches a member positioned in accordance with the value of the condition being measured, at which time mechanism is operated to open the switch.

During the time that the switch at the transmitter remains closed, the positioning member is moved synchronously with the feeler; and thus, when the switch is opened, the positioning member has moved a distance dependent upon the value of the condition being measured. Mechanism then moves the receiver pointer to a position depending upon the distance that the positioning member has been moved, and the positioning member is returned to its original position.

As stated above, the present invention relates to the transmitter, and the receiver may be any one of the type where time is the variable factor employed in the transmission of the reading.

An object of this invention is to provide an improved telemetric system. Another object is to provide an improved transmitter for a telemetric system.

The above and other objects will be apparent from the detailed description and drawings, wherein the preferred embodiment of this invention is illustrated.

In the drawings:

Figure 6 is a sectional view on the line 6—6 of Figure 5;

Figure 7 is a view similar to Figure 4, but showing the mechanism during the sending portion of the cycle and immediately before the signal is stopped by tripping mechanism;

Figure 8 is a view similar to Figure 7 but showing the mechanism during the cycle in the position immediately after the signal has been stopped by tripping mechanism.

Figure 1:
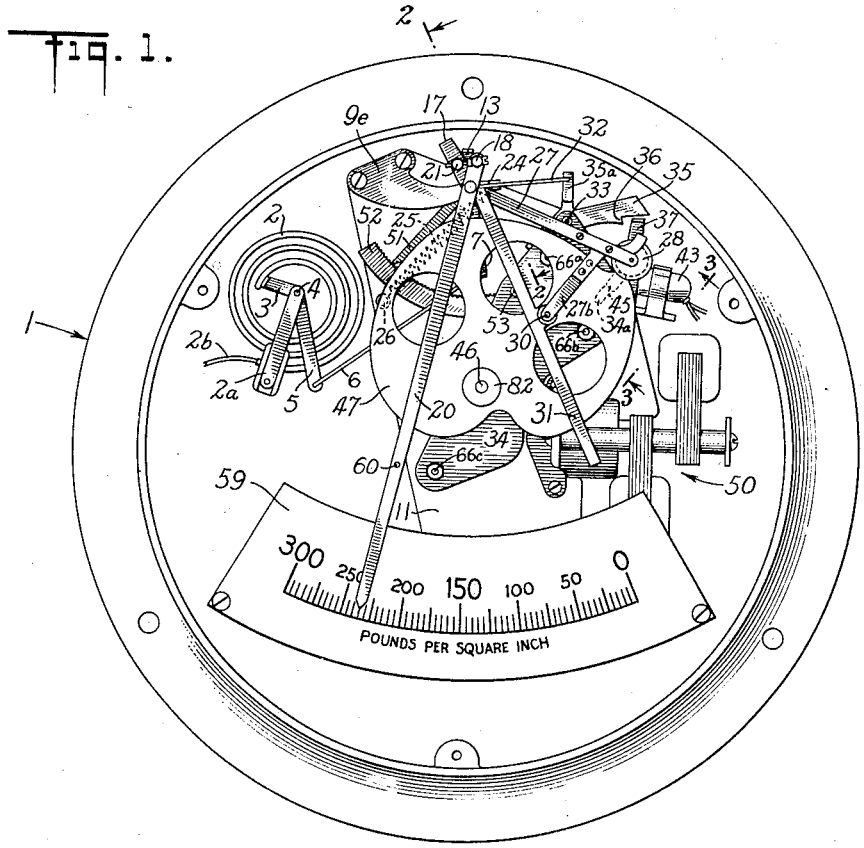
Figure 1 is a front elevation of a transmitter instrument chosen to illustrate a preferred embodiment, the cover of the case in which the instrument is mounted having been removed.

Referring to the upper left-hand portion of Figure 1, one part of the transmitter may be any condition-responsive element and in this embodiment comprises a spiral pressure-measuring member 2 which positions a pointer 20 over a scale 59. The other part of the transmitter comprises the transmitting mechanism proper which originates a succession of signals, the length of each signal being dependent upon the pointer position at the time the signal is transmitted. At the right-hand side of the figure is shown a synchronous motor 50 which drives the moving parts of the transmitting mechanism at constant speed.

Pressure-measuring member 2 is fixed at its outer end to a bracket 2a mounted on the back wall of case 1. Connected with the outer end of member 2 is a tube 2b which is connected to a pressure, the value of which is being measured and transmitted. The inner free end of the pressure-responsive element 2 is suitably connected to the short arm 3 of a bell crank which is pivoted at 4 between a pair of extensions of the bracket 2a. As the pressure in element 2 changes in response to changes in the pressure being measured, the inner end rotates the bell crank about the pivot point 4. This motion moves the long arm 5 of the bell crank which is connected by a link 6 (see the central portion of Figure 2) to an actuating arm 7 which actuates pointer 20.

The transmitting mechanism, proper, and pointer 20 are mounted as a unit upon base plate 11 which is attached to the back wall of case 1. Referring to the central portion of Figure 3, plate 34 is rigidly mounted in spaced parallel relationship upon base 11 by means of posts 66a, 66b, and (Figure 1) 66c, and cooperates with base 11 to provide mounting means for various elements of the transmitting mechanism.

Figure 2:
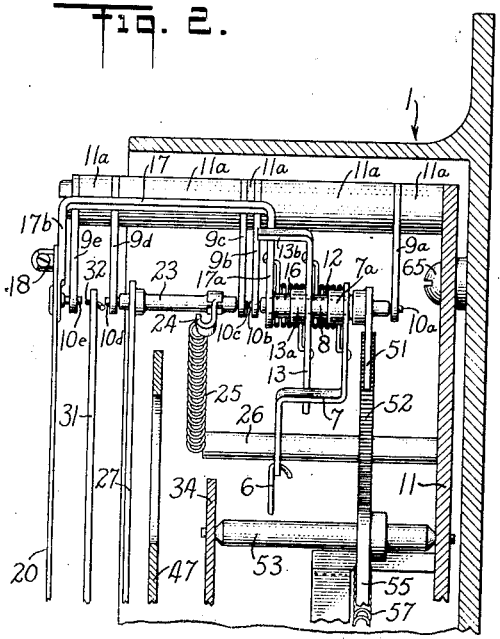
Figure 2 is a sectional view on the line 2—2 of Figure 1.

Pointer 20 is supported with certain portions of the transmitting mechanism by a supporting unit such as described in U. S. Patent No. 1,778,702, issued October 14, 1930, to B. H. Bristol et al. This supporting unit is shown in Figures 1 and 2, and comprises five spaced parallel vertical supporting plates 9a, 9b, 9c 9d and 9e, which are all supported between spacers 11a upon posts extending forwardly from base 11. Each supporting plate is provided at its free end with a pivot hole, all of which holes are in axial alignment and through which extend pivots 10a, 10b, 10c, 10d, and 10e, of various rotatable elements to be described later. These pivots hang in their pivot holes so that the various elements are accurately positioned with a minimum of friction.

Referring to Figure 2, integral with the end of actuating arm 7, which extends between supporting plates 9a and 9b, is a sleeve 7a, which is rotatably mounted upon shaft 8. Shaft 8 is supported by plates 9a and 9b by means of pivots 10a and 10b.

Also freely mounted upon shaft 8 and spaced forwardly from sleeve 7a is a sleeve 13a which carries an intermediate arm 13. The downwardly extending portion of arm 13 is positioned to swing into contact with the central offset portion of arm 7 and is provided at its upper end with a laterally extending portion.

At the forward end of shaft 8 is fixedly mounted the back leg 17a of a U-member 17, the forward leg 17b of which is carried by pivot 10e. The laterally extending portion of arm 13 is positioned to swing into contact with one side of leg 17a.

Figure 4:
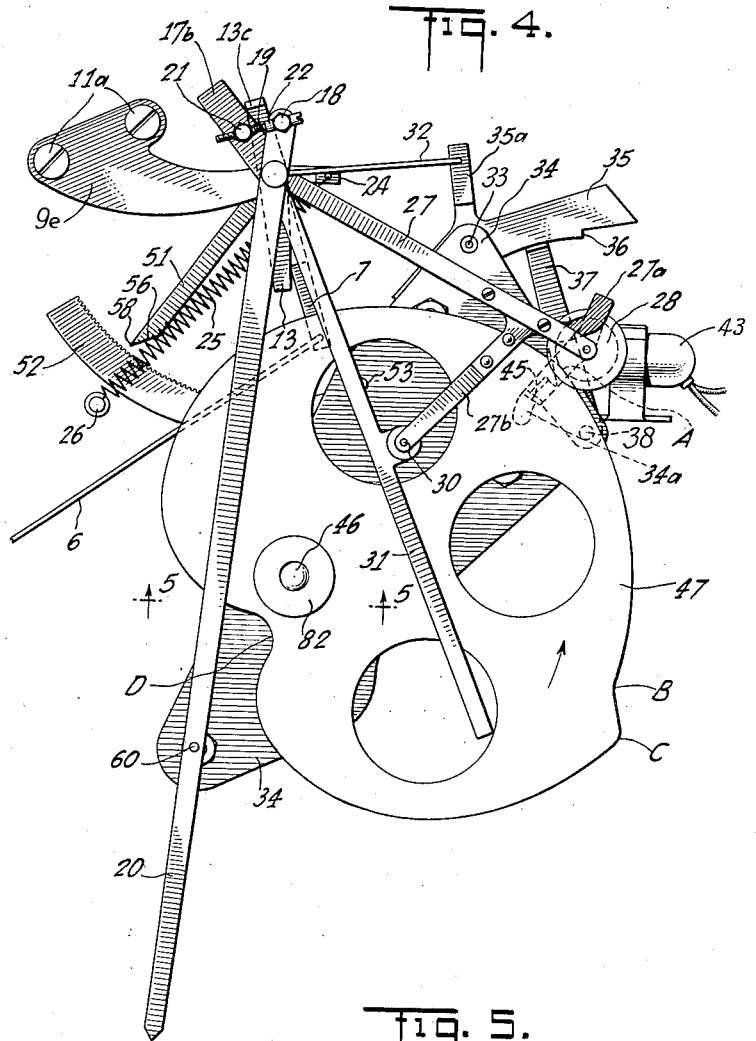
Figure 4 is an enlarged front elevation of the transmitter mechanism, shown in the position immediately before the starting of a cycle of operation whereby a signal is sent.

Rotatably mounted upon pivot 10e on the forward side of leg 17b is pointer 20. Extending outwardly from the upper end of pointer 20 is stud 18 which, as best shown in Figure 4, carries screw 19, screw 19 being held against axial movement by its head and collar 22. The left end of screw 19 is threaded through stud 21, which is pivotally attached to leg 17b.

Referring again to Figure 2, in order to secure a resilient control connection between the actuating arm 7 and the pointer 20, coiled springs 12 and 16 are mounted around shaft 8 and are adapted to transmit movement from arm 7 to U-member 17 and vice versa. Coiled spring 12 is mounted between and has one end attached to each of arms 7 and 13 and biases the downwardly extending portion of intermediate arm 13 in a counter-clockwise direction (Figure 1) against the offset portion of actuating arm 7. In a like manner, coiled spring 16 is mounted between and has one end attached to each of members 13 and 17 and biases leg 17a in a clockwise direction against the end of the laterally extending portion of intermediate arm 13.

Due to this construction, movement of arm 7 tends to move pointer 20; but if the pointer is held against movement, arm 7 may still move. If, for example, pointer 20 is held stationary and arm 7 is moved in a clockwise direction, intermediate arm 13 will be carried with arm 7 away from leg 17a. This movement will increase the tension of spring 16. On the other hand, if pointer 20 is held stationary while arm 7 is moved in a counter-clockwise direction, intermediate arm 13 will remain stationary so as to separate the offset portion of arm 7 from intermediate arm 13, and thus increase the tension of spring 12. When pointer 20 is released it is quickly moved by the abnormally tensioned spring to its normal position with respect to arm 7.

Fixedly mounted upon shaft 8 is a latch arm 51 (see also Figure 4) which is bevelled on its lower end at 56 so as to form a pawl edge 58. Adjacent pawl edge 58 is arcuate latch 52 which, as best shown in Figure 6, is rotatably mounted upon shaft 53 between base 11 and plate 34. Arcuate latch 52 has a serrated side which may swing into and out of engagement with edge 58 and when in contact therewith holds latch arm 51 and thus shaft 8, U-member 17 and pointer 20 stationary. Integral with arcuate latch 52 and extending downwardly is roller arm 55, upon the lower end of which is mounted roller 55a. To bias the arm 52 toward the latch arm 51, a spring 57 is attached at one end to arm 55 and at the other to base bracket 11a. Thus pointer 20 is normally held against movement.

Transmitting mechanism

Figure 5:
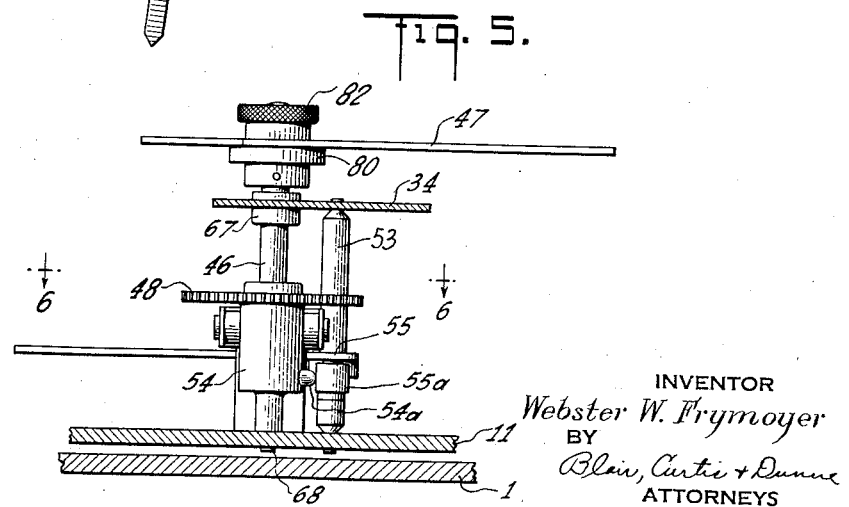
Figure 5 is a sectional view on the line 5—5 of Figure 4.

Referring to Figure 5, a constantly rotating cycling shaft 46 is positioned to the left of roller 55a and extends from base 11, where it is pivoted at 68, out and through a bearing 67 in plate 34. Cycling shaft 46 has rigidly mounted near its inner end hub 54 which carries pin 54a in the vertical plane of roller 55a.

Mounted upon the outer end of hub 54 is gear 48 which, as best shown in Figure 6, is driven through worm 49 by synchronous motor 50 so that cycling shaft 46 is rotated at the constant rate of one revolution per minute. As cycling shaft 46 is thus rotated pin 54a is periodically moved so as to engage roller 55a (Figures 5 and 6), thus swinging arm 55 an arcuate latch 52 from the position shown in Figures 1 and 8 to the position shown in Figures 4 and 6, and releasing pointer 20 so that it may assume its normal position with respect to element 21.

Referring to Figure 5, mounted upon the outer end of cycling shaft 46 between fixed collar 80 and nut 82 is cam 47. As will be explained later, cam 47 is the active cycling means which causes a signal to be started and causes the feeler to move across the instrument scale.

As best shown in Figure 2, mounted on pivots 10c and 10d, and between plates 9c and 9d, is shaft 23, upon the outer end of which is rigidly mounted cam follower arm 27. Referring to Figure 4, cam follower arm 27 extends generally downwardly and to the right and has a grooved roller 28 mounted on its free end in a suitable yoke 27a and in the plane of cam 47. Referring to Figure 2, rigidly mounted near the inner end of pivot pin 23 is arm 24 which carries at its outer end one end of spring 25, the other end of spring 25 being attached to post 26 secured to base plate 11.

Spring 25 biases arm 24 and with it shaft 23 and cam follower arm 27 clockwise so as normally to hold grooved roller 28 engaged with the edge of cam 47. During rotation of cycling shaft 46 follower arm 27 is thus urged clockwise so that roller 28 may engage the cam.

Figure 3:
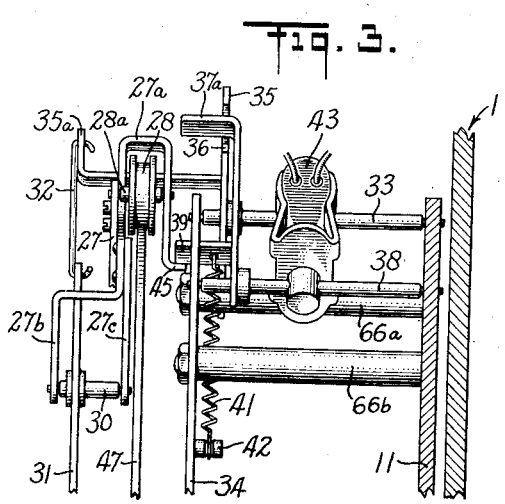
Figure 3 is a sectional view on line 3—3 of Figure 1.

As shown best in Figure 3, yoke 27a has integral therewith feeler bracket portion 27b which cooperates with arm 27c to support feeler pivot 30. Rigidly mounted near the outer end of feeler pivot 30 is feeler 31 which, as shown best in Figures 1, 7 and 8, extends generally upwardly to a point between the ends of arms 9d and 9e (see also Figure 2) and extends downwardly to a point adjacent the upper edge of scale 59. As will be explained later, during each cycle feeler 31 is moved from the position shown in Figure 1, clockwise until the lower end thereof engages (see Figure 8) pin 60 which extends inwardly from pointer 20.

As best shown in Figure 3, mounted between base 11 and plate 34 is switch shaft 38, upon which is rigidly mounted switch 43. Also rigidly mounted upon the outer end of shaft 38 is a forked arm 37 (see Figures 7 and 8) having a latch portion 37a and an operating arm 39 which is bent to extend outwardly through a slot 34a (Figure 4) in plate 34. Slot 34a is of such size and position that switch 43 is allowed to rock from the open position (shown in Figure 8) clockwise to the closed position (shown in Figure 7). Spring 41 is secured at one end to operating arm 39 and biases switch 43 toward open position. As shown in Figure 3, the other end of spring 41 is secured to post 42 on the back side of plate 34.

The inner end 45 of yoke 27a is bent to engage the outer end of operating arm 39. As cam 47 moves follower arm 27 to the position shown in Figure 1, portion 45 engages operating arm 39 and rocks switch 43 to closed position (Figures 1 and 7). Adjacent the free end of latch portion 37a is switch latch 35 which is rockably mounted upon pivot 33 between base 11 and plate 34. Switch latch 35 has a stop portion 35b which limits counter-clockwise movement by engagement with post 66a and is biased clockwise by gravity so as to normally ride upon latch portion 37a. As switch 43 is rocked from the position shown in Figure 4 to the closed position shown in Figure 7, latch portion 37a moves to the right along the under side of switch latch 35 and switch latch 35 falls to the position shown in Figure 1. As cam follower arm 27 then moves clockwise so that angle portion 45 disengages operating arm 39, spring 41 biases switch 43 toward the open position to the position shown in Figure 7. Arm 35 is notched on the under side at 36 where it engages latch portion 37a and holds switch 43 in closed position.

Extending upwardly from the left end of switch latch 35 is releasing arm 35a, the free end of which carries one end of link 32, the other end of link 32 being carried by the upper end of feeler 31.

Switch latch 35 thus may move clockwise to the position shown in Figure 7 and, in doing so, swings feeler 31 clockwise slightly on its pivot pin 30 from the position shown in Figure 8 to the position shown in Figure 7. If, however, the elements are in the position shown in Figure 7 and feeler 31 is moved counter-clockwise, switch latch 35 will be moved counter-clockwise about its pivot and notch 36 will be moved out of engagement with the end of latch portion 37a and spring 41 will be allowed to swing switch 43 to its open position, (i. e., as shown in Figure 8).

As pointed out above, cycling shaft 46 rotates at a constant rate and cam 47 is shaped so as to cause feeler 31 to move at timed intervals to the left along the path of pointer 20 at a constant rate. Referring to Figure 4, the periphery of cam 47 is divided into four more or less distinct sections at the points A, B, C and D. While cam 47 rotates counter-clockwise from the position shown and roller 28, riding upon its periphery, is approached by point B, feeler 31 is moved counter-clockwise and, when point B is reached, angle portion 45 engages operating arm 39.

As best shown in Figure 6, during this movement, pin 54a contacts roller 55a so as to move arcuate latch 52 out of contact with arm 51 and thus releases pointer 20. This allows pointer 20 to assume its normal position with respect to pressure-responsive element 2. Pin 54a then moves out of contact with roller 55a and pointer 20 is again latched.

Referring again to Figure 4, as cam 47 rotates further and roller 28 is reached by point C, angle portion 45 has moved operating arm 39 so as to swing switch 43 to the closed position shown in Figure 1. Switch 43 is thus closed at the time point C reaches roller 28 and the signal is started. Upon further rotation of cam 47, feeler 31 now moves clockwise along the path of pointer 20 until the lower end of feeler 31 engages pin 60, as shown in Figure 7.

This engagement stops the lower end of feeler 31, and cam 47 tends to move away from roller 28. Spring 25, biasing follower arm 27, moves the center of feeler 31 to the left and in doing so rotates feeler 31 about pin 60. The upper end of feeler 31 is thus moved from the position shown in Figure 7 to the position shown in Figure 8, this movement being transmitted through link 32 to rotate switch latch 35 counter-clockwise against stop 66a. This latter movement releases the engagement of notch 36 with latch portion 37a, and spring 41 is allowed to move switch 43 to the open position, thus terminating the signal.

The portion of cam 47 between point D and point A then contacts roller 28 to return feeler 31 to the position shown in Figure 4 so as to start a new cycle.

At the telemeter receiver with the starting of a signal, it is presumed that a positioning member is moved simultaneously and synchronously with the feeler 31 until the signal is stopped; whereupon the suitable parts are operated to position a pointer and reposition the parts for another signal. Such a receiver, for example, is shown in Wilde Reissue Patent No. 19,039, January 2, 1934, Remote control indicator system.

In the above description it is, of course, understood that switch 43 is closed substantially at the time feeler 31 starts moving along its path and that switch 43 is opened substantially at the time feeler 31 engages pin 60. Although the present apparatus operates with slight variations from these conditions, these variations may be taken care of by adjustment of the transmitter and receiver as a unit.

As various embodiments might be made of this invention, and as various changes might be made in the construction herein described, all without departing from the scope of the invention, it is to be understood that all matter herein set forth or shown in the accompanying drawings is to be interpreted as illustrative and not in a limiting sense.

I claim:

1. In a telemetric system, a transmitter having a member positioned by a condition-sensitive means, a feeler adapted to oscillate from a predetermined starting position along a path to contact said member, means including a cam for operating said feeler, said cam having a predetermined shape and being so related that said feeler is moved at a predetermined rate and means for starting a signal at the time said feeler starts moving from said predetermined position and stopping said signal when said feeler contacts said member.

2. In a telemetric system, a member positioned by condition-sensitive means and resiliently connected thereto, a feeler, means including a cam for oscillating said feeler from a predetermined starting position along a path to contact said member, said cam having a predetermined shape and being so related that said feeler is moved at a predetermined rate and subsequently to return said feeler over the same path to said predetermined position, and means for sending a starting signal at the time said feeler starts moving from said predetermined position, and a stopping signal when said feeler contacts said member.

3. In a telemetric system, a member positioned by condition-sensitive means and resiliently connected thereto, a feeler, means including a cam for oscillating said feeler from a predetermined starting position along a path to contact said member, and subsequently to return said feeler to said predetermined position over the same path, means for sending a starting signal at the time said feeler starts moving from said predetermined position, and a stopping signal when said feeler contacts said member, and means to hold said member from movement during the time that it is contacted by said feeler.

4. In a telemetric system, an electrical switch, a feeler member, cycling means to move said feeler member from a predetermined position along a given path, means controlling the distance which said feeler member moves along said path, and means associated with said cycling means which closes said switch when said feeler member starts moving from said point and which opens said switch when said feeler member ceases to move along said path.

5. In a telemeter transmitter, a switch, a circuit associated with said switch, a feeler member, means to periodically move said feeler member along a given path a distance dependent upon the value of a condition, and means operating said switch to commence a signal through said circuit when said feeler starts moving in one direction along said path and for stopping said signal when said feeler reaches the end of its travel as determined by the value of the condition.

6. In a telemetric system, a transmitter comprising, a rotatable shaft, means to rotate said shaft at a known speed, a cam mounted upon said shaft, a pivoted follower arm having a roller upon the free end thereof positioned so that said roller may be moved into engagement with the periphery of said cam, means to bias said roller against said cam, a switch mechanism adapted to move from an open to a closed position, means biasing said switch to its open position, latch means positionable to hold said switch in its closed position, a pointer the position of which is controlled by a condition responsive element, a feeler member carried by said follower arm and adapted to move along the path of said pointer, a link mechanism connecting said feeler member to said latch, and means upon said follower arm adapted to move said switch from its open to its closed position.

7. In a telemetric system, a transmitter comprising, a rotatable shaft, means to rotate said shaft at a known speed, a cam mounted upon said shaft, a pivoted follower arm having a roller upon the free end thereof positioned so that said roller may be moved into engagement with the periphery of said cam, means to bias said roller against said cam, a switch mechanism adapted to move from an open to a closed position, means biasing said switch to its open position, latch means positionable to hold said switch in its closed position, a pointer the position of which is controlled by a condition responsive element, a feeler member carried by said follower arm and adapted to move along the path of said pointer, a link mechanism connecting said feeler member to said latch, means upon said follower arm adapted to move said switch from its open to its closed position, the shape and rotation of said cam being such that said follower arm is moved so as to close said switch and then advance said feeler along the path of said pointer, said feeler being mounted so that when it contacts said pointer said link mechanism will be moved so as to displace said latch and thus release said switch.

8. In a telemetric system, a transmitter comprising, a rotatable shaft, means to rotate said shaft at a known speed, a cam mounted upon said shaft, a pivoted follower arm having a roller upon the free end thereof positioned so that said roller may be moved into engagement with the periphery of said cam, means to bias said roller against said cam, a switch mechanism adapted to move from an open to a closed position, means biasing said switch to its open position, latch means positionable to hold said switch in its closed position, a pointer the position of which is controlled by a condition responsive element, a feeler member carried by said follower arm and adapted to move along the path of said pointer, a link mechanism connecting said feeler member to said latch, means upon said follower arm adapted to move said switch from its open to its closed position, said pointer being resiliently connected to said condition responsive means, mechanism to hold said pointer in a fixed position at the time said feeler is advancing along said path.

9. In a telemetric system, means responsive to a condition, a positionable member, means resiliently connected with said condition-sensitive means and said positionable member, a cam, a cam follower and a feeler pivoted on said cam follower, means for causing relative movement between said cam and said cam follower and for resiliently urging said cam follower against said cam whereby said feeler is periodically oscillated from a position at one end of the path of said positionable member to contact therewith, and means for holding said positionable member against movement during the feeling movement of said feeler.

10. In a telemeter transmitter, in combination, a member movable about an axis in response to a condition being transmitted, a cam, a cam follower and a lever pivoted on said cam follower, means connecting said lever at a point thereon with said signal-sending mechanism, said cam and cam follower periodically moving a portion of said lever from a point at one end of the path of said movable member to an operative relation therewith, and the shape of said cam and the relative movement of said cam and cam follower and the point of connection of said lever with said signal-sending mechanism being such that said lever is moved toward operative relation with said movable member at a constant speed.

11. In a telemeter transmitter, in combination, a member movable about an axis in response to a condition to be transmitted, a second member movable about an axis substantially coaxial with said first axis, and a cam for oscillating said second member with respect to said first member, said cam being movable about an axis removed from said first axis.

12. In a telemeter transmitter, in combination, a member movable about an axis in response to a condition to be transmitted, a second member movable about an axis substantially coaxial with said first axis, a cam for oscillating said second member with respect to said first member and movable about an axis removed from said first axis, and means operable by the co-action of said first and second members for sending a signal varying in characteristic with the position of said first member.

13. In a telemeter transmitter, in combination, a member movable about an axis in response to a condition to be transmitted, a second member movable about an axis substantially coaxial with said first axis, a cam for oscillating said second member with respect to said first member being movable about an axis removed from said first axis, a cam follower member pivoted about an axis substantially coaxial with said first axis, said second member being pivoted on said cam follower, switch-operating mechanism, and a link connecting a free end of said second member and said signal-sending mechanism for operating said last mechanism.

14. In a telemeter transmitter, in combination, a member movable about an axis in response to a condition to be transmitted, a second member movable about an axis substantially coaxial with said first axis, a cam for oscillating said second member with respect to said first member being movable about an axis removed from said first axis, a cam follower member pivoted about an axis substantially coaxial with said first axis, said second member being pivoted on said cam follower, signal sending mechanism, a link connecting a free end of said second member and said signal-sending mechanism for operating said last mechanism in one way, and means on said cam follower mechanism operating said signal-sending mechanism in an opposite way.

15. In a telemetric system, in combination, means responsive to a condition, a positionable member, means resiliently connected with said condition-responsive means and said positionable member, a feeler, means for yieldingly oscillating said feeler from a position at one end of the path of the positionable member and to cause said feeler member to engage said positionable member, and means for holding said positionable member against movement during feeling movement of said feeler.

16. In a telemetric system, a positionable member responsive to a condition being transmitted, a feeler member, cycling means for oscillating the feeler member over the path of said positionable member and to cause said feeler member to engage said positionable member, a mercury switch, means for mechanically changing said switch simultaneously with the feeler commencing its movement over the said path and for mechanically reversing said switch by contact of said feeler with said positionable member.

17. In a telemetric transmitter, in combination, a positionable member positioned in accordance with the value of the condition being transmitted, a continually moving cam, a cam follower, signal-sending means, latch mechanism for operating said signal-sending means, means on said cam follower for operating said latch mechanism in one way as the cam follower rides onto a hill on said cam, and means carried by said cam follower movable over the path of said positionable member for operating said latch mechanism in the other way by contact of said means with said positionable member.

18. In a telemetric transmitter, in combination, a positionable member positioned in accordance with the value of the condition being transmitted, a continually moving cam, a cam follower, signal-sending means including a tiltable mercury switch biased to open position, latch mechanism, means on said cam follower for simultaneously closing said switch and operating said latch mechanism to hold the switch closed, and means associated with said cam follower and movable over the path of said positionable member for tripping said latch mechanism by contact of said last-named means with said positionable member to release said switch to its biased open position.

19. In a telemeter transmitter, a member movable about an axis in response to a condition the value of which is being transmitted, a cam movable about an axis spaced from said first axis, a cam follower also pivoted about said first axis, a lever pivoted on said cam follower, latch mechanism for operating signal-sending means, a link connecting said latch mechanism with said lever at a connecting point substantially coincident with said first axis and to cause said lever to pivot about said connecting point upon movement of said cam follower, and means for causing said lever to pivot upon said cam follower when said lever and positionable member reach a predetermined relative position to operate said latch mechanism.

20. In a telemetric system, in combination, a positionable member positioned by a condition-sensitive means; a cyclic feeler adapted to move from a predetermined starting position along a path to contact said positionable member; feeler-operating means including a constantly operating motor, a cam driven thereby, a cam follower adapted to move said feeler, and means holding said feeler, said cam-follower and said cam in operative relationship during the initial part of each cycle which is rendered ineffective when said feeler contacts said positionable member.

21. In a telemetric system, in combination, a positionable member positioned by a condition-sensitive means; a constantly rotating motor; a cam connected to be rotated constantly by said motor; a cam follower; holding means normally holding said cam follower in operative relationship with said cam; a feeler mounted to be moved by said cam follower from a predetermined starting position along a path to contact said positionable member; said holding means being rendered ineffective when said feeler contacts said positionable member.

22. In a telemetric system, in combination, a positionable member movable to a position corresponding to a value being telemetered, a constantly rotating motor, a cam driven by said motor, a feeler rockably mounted upon a pivot movably mounted to move between predetermined limits, a cam follower operated by said cam and adapted to move said pivot and feeler along a path into contact with said positionable member, and means holding said feeler, said cam follower and said cam in operative relationship during the initial part of each cycle of operation which means is rendered ineffective when said feeler contacts said positionable member.

23. In combination with a condition sensitive means having a positionable member pivoted to move about an axis, a control mechanism including a feeler, mounting means mounting said feeler upon a movable pivot to swing said feeler about an axis in alignment with said first-named axis and to rock said feeler when it contacts said positionable member.

24. In combination with a condition sensitive means having a positionable member pivoted to move about an axis, a control mechanism including a feeler, mounting means mounting said feeler upon a movable pivot to swing said feeler about an axis in alignment with said first-named axis and to rock said feeler when it contacts said positionable member, said feeler being mounted on a pivot between said first-named axis and the point of contact with said positionable member.

25. In combination with a condition sensitive means having a positionable member pivoted to move about an axis, a control mechanism including a feeler, mounting means mounting said feeler upon a movable pivot to swing said feeler about an axis in alignment with said first-named axis and to rock said feeler when it contacts said positionable member to displace the axis of its swinging movement from alignment with said first-named axis.

26. In combination with a condition-sensitive means having a positionable member, a control mechanism including a feeler, mounting means rockably mounting said feeler to move it along the path of the positionable member so that it contacts said positionable member and is rocked, and a control mechanism connected to be operated by the rocking of said feeler.

27. In combination with a condition-sensitive means having a positionable member, a control mechanism including a feeler, mounting means rockably mounting said feeler to move it along the path of the positionable member so that it contacts said positionable member and is rocked, and a control mechanism connected through a link to one end of said feeler to be operated by the rocking of said feeler.

WEBSTER W. FRYMOYER.